US012447091B2

(12) United States Patent
Soeken

(10) Patent No.: US 12,447,091 B2
(45) Date of Patent: Oct. 21, 2025

(54) HEADACHE TREATMENT ASSEMBLY

(71) Applicant: Lucas Soeken, Taylorsville, UT (US)

(72) Inventor: Lucas Soeken, Taylorsville, UT (US)

( * ) Notice: Subject to any disclaimer, the term of this patent is extended or adjusted under 35 U.S.C. 154(b) by 967 days.

(21) Appl. No.: 17/565,578

(22) Filed: Dec. 30, 2021

(65) Prior Publication Data

US 2023/0210709 A1 Jul. 6, 2023

(51) Int. Cl.
*A61H 7/00* (2006.01)
*A61H 99/00* (2006.01)

(52) U.S. Cl.
CPC ..... *A61H 7/001* (2013.01); *A61H 2201/1253* (2013.01); *A61H 2201/1635* (2013.01); *A61H 2201/1645* (2013.01); *A61H 2205/062* (2013.01)

(58) Field of Classification Search
None
See application file for complete search history.

(56) References Cited

U.S. PATENT DOCUMENTS 5,694,939 A * 12/1997 Cowings .............. A61B 5/6804 600/27
5,730,708 A * 3/1998 Spratt .................... A61H 7/003 601/118
6,685,660 B1 2/2004 Taverna
8,137,379 B2 3/2012 Labash
10,307,332 B2 6/2019 Cheng
2001/0025905 A1 * 10/2001 Carpenter .............. A61B 90/50 248/231.71
2015/0320637 A1 11/2015 Henre
2017/0042764 A1 2/2017 Tima
2019/0142685 A1 5/2019 Heller
2019/0336761 A1 11/2019 Yoo

FOREIGN PATENT DOCUMENTS

CN 105769543 7/2016

* cited by examiner

*Primary Examiner* — Kendra D Carter
*Assistant Examiner* — Graciela Natalia Lebron De Jesus

(57) ABSTRACT

A headache treatment assembly includes a clamping unit that has a pair of grips each is movably disposed in opposing sides of a clamping recess in the clamping unit. Each of the grips is urgeable toward each other to pinch a trapezius muscle at a strategic location to treat symptoms of a headache. A tube is coupled to and extends away from the clamping unit and the tube curves beneath the user's armpit when the clamping unit is positioned on the user's trapezius muscle. A knob is rotatably disposed on the tube and the knob is in mechanical communication with the clamping unit. The grips are urged toward each other when the knob is rotated in a first direction and the grips are urged away from each other when the knob is rotated in a second direction.

8 Claims, 5 Drawing Sheets

HEADACHE TREATMENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to headache devices and more particularly pertains to a new headache device for pinching a pressure point to treat a headache. The device includes a clamping unit which includes a pair of grips that are urgeable toward each other to pinch a user's trapezius muscle. The device includes a knob that can be rotated for either tightening or loosening the grips to adjust an intensity with which the user's trapezius muscle is pinched.

(2) Description of Related Art Including Information Disclosed Under 37 CFR 1.97 and 1.98

The prior art relates to headache devices including a massage vibrator that includes a pair of resilient arms which are vibrated to massage a user's body. The prior art discloses a variety of muscular clamp devices for pinching a selected pressure point in a muscle for relieving muscle tension. The prior art discloses a variety of acupressure clamps for imparting pressure on an acupressure point. The prior art discloses a wearable pressure point device that includes a pair of engagements and a curved member extending between the engagement for biasing the engagements toward each other to pinch a pressure point on a user's body. The prior art discloses a muscle massaging device that includes a band which is extendable around a user's body and a pair of massagers that are each disposed on the band for positioning over a massage point on the user's body.

BRIEF SUMMARY OF THE INVENTION

An embodiment of the disclosure meets the needs presented above by generally comprising a clamping unit that has a pair of grips each is movably disposed in opposing sides of a clamping recess in the clamping unit. Each of the grips is urgeable toward each other to pinch a trapezius muscle at a strategic location to treat symptoms of a headache. A tube is coupled to and extends away from the clamping unit and the tube curves beneath the user's armpit when the clamping unit is positioned on the user's trapezius muscle. A knob is rotatably disposed on the tube and the knob is in mechanical communication with the clamping unit. The grips are urged toward each other when the knob is rotated in a first direction and the grips are urged away from each other when the knob is rotated in a second direction.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
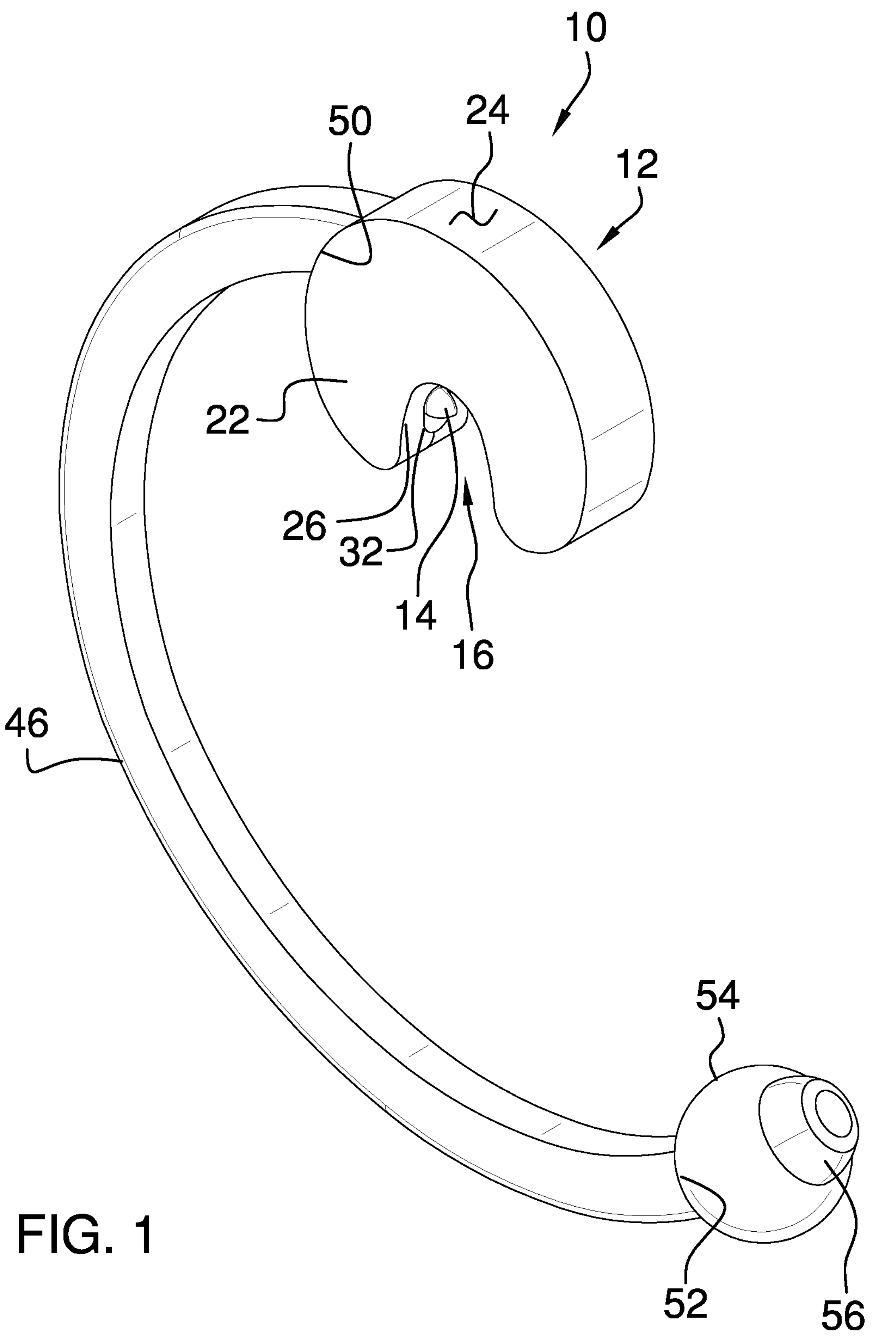
FIG. 1 is a perspective view of a headache treatment assembly according to an embodiment of the disclosure.
Figure 2:
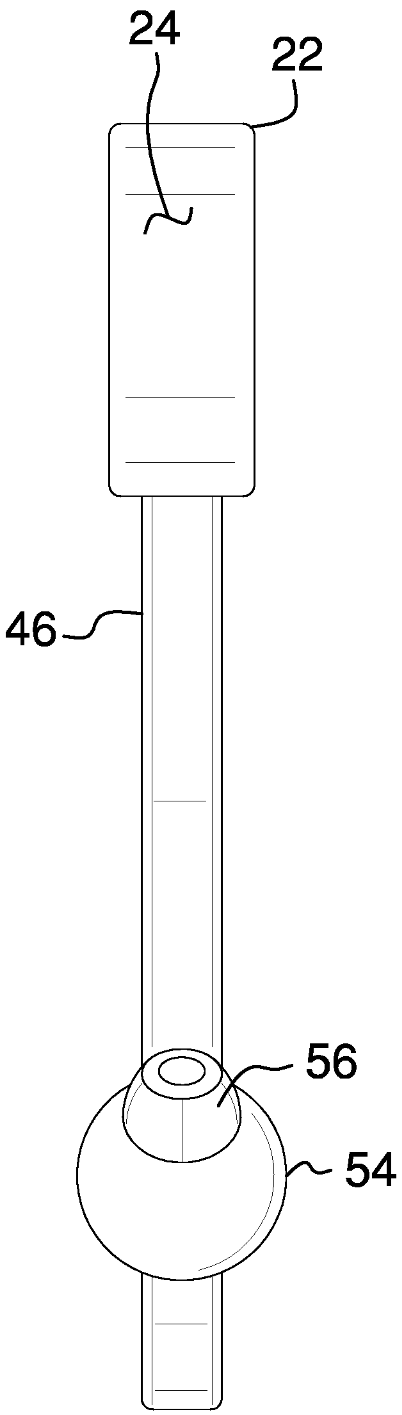
FIG. 2 is a front view of an embodiment of the disclosure.
Figure 3:
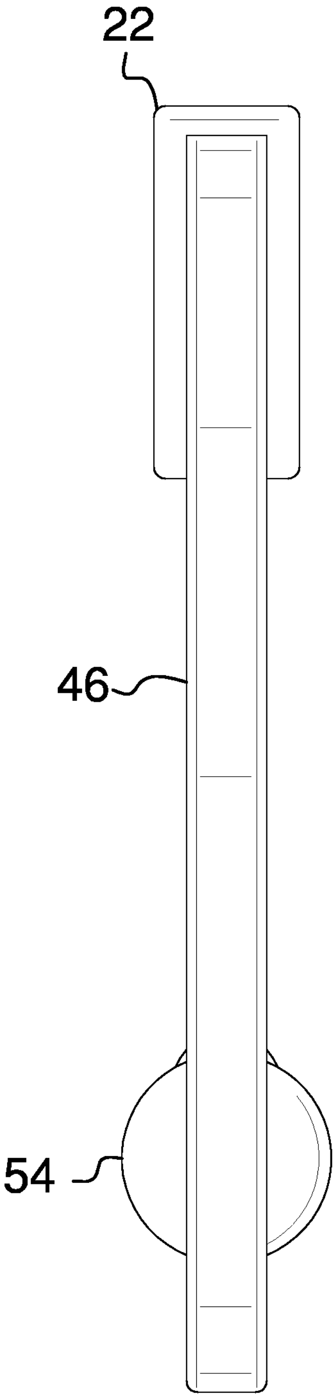
FIG. 3 is a back view of an embodiment of the disclosure.
Figure 4:
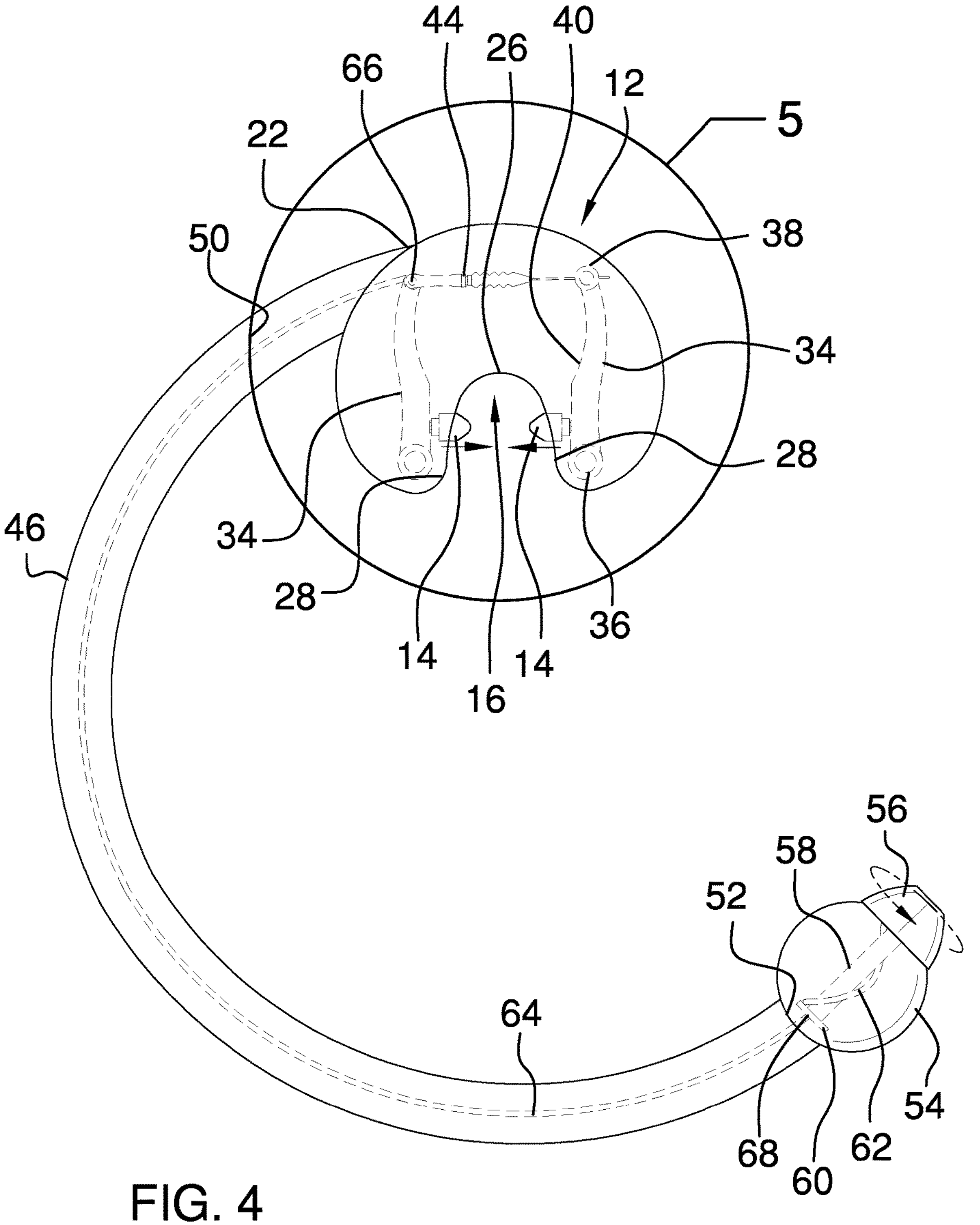
FIG. 4 is a right side phantom view of an embodiment of the disclosure.
Figure 5:
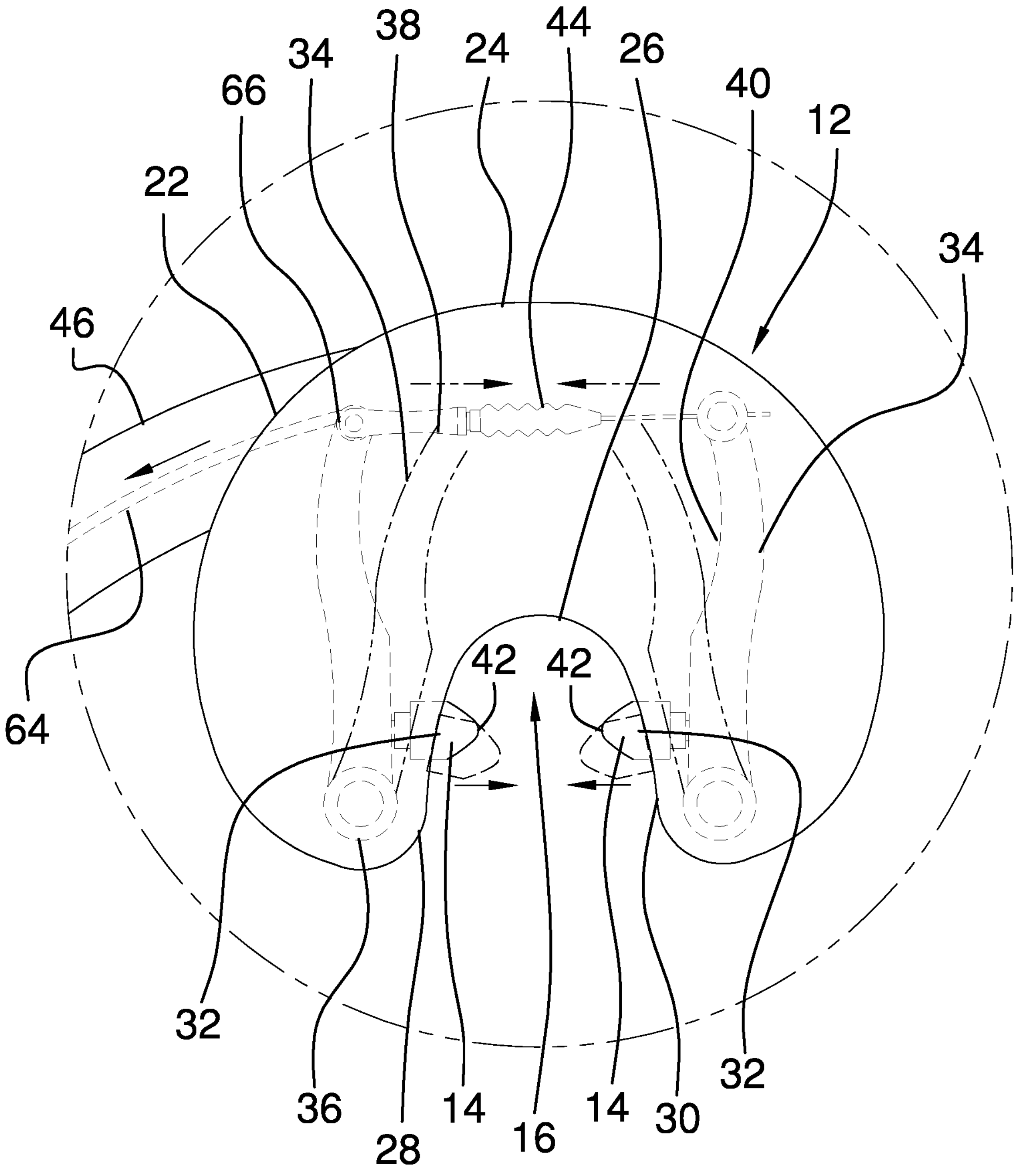
FIG. 5 is a detail phantom view taken from circle 5 of FIG. 4 of an embodiment of the disclosure.
Figure 6:
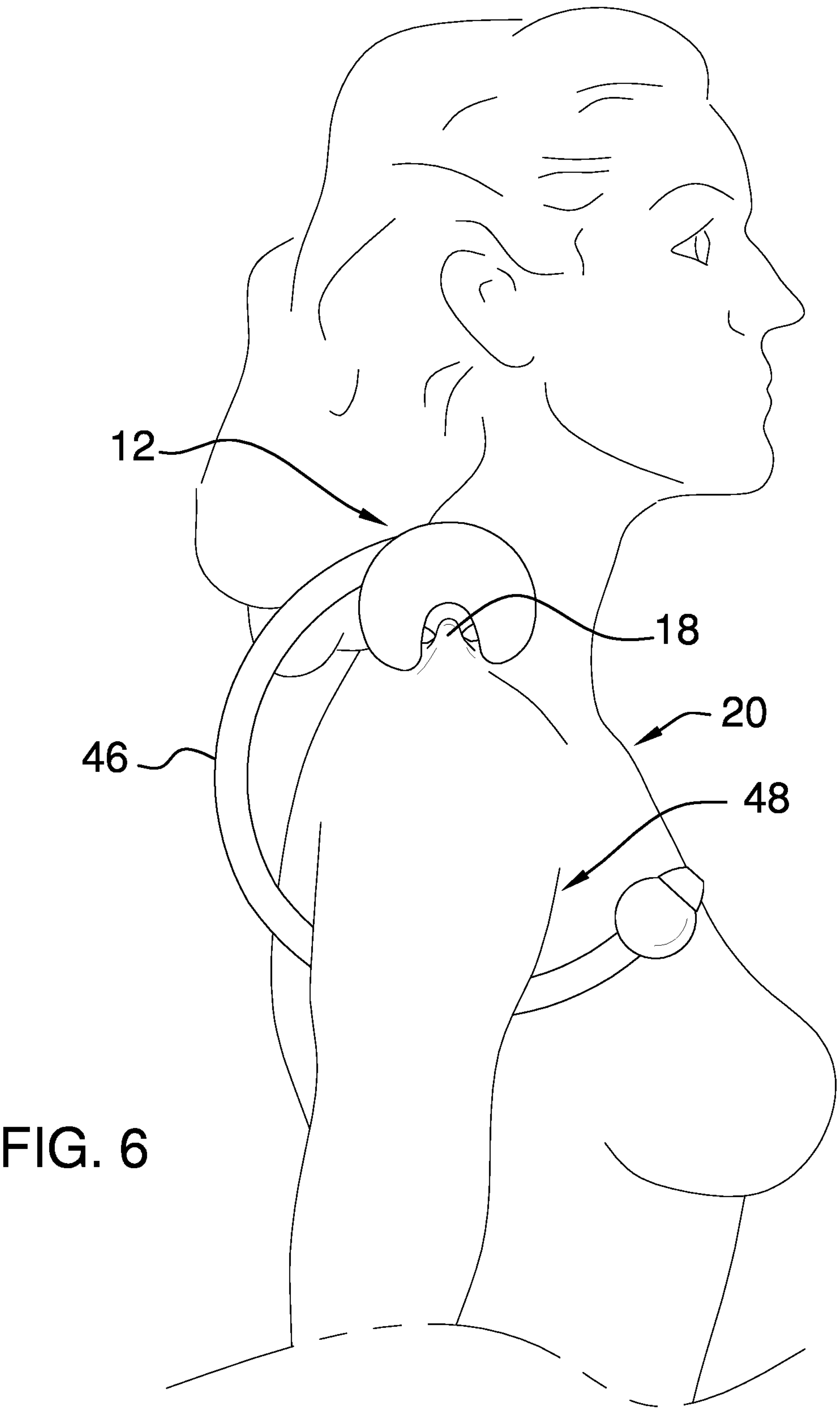
FIG. 6 is a perspective in-use view of an embodiment of the disclosure.

With reference now to the drawings, and in particular to FIGS. 1 through 6 thereof, a new headache device embodying the principles and concepts of an embodiment of the disclosure and generally designated by the reference numeral 10 will be described.

As best illustrated in FIGS. 1 through 6, the headache treatment assembly 10 generally comprises a clamping unit 12 that has a pair of grips 14 each being movably disposed on opposing sides of a clamping recess 16 in the clamping unit 12. Additionally, the clamping recess 16 can receive a trapezius muscle 18 of a user 20. Each of the grips 14 is urgeable toward each other to pinch the trapezius muscle 18 at a strategic location for treating symptoms of a headache.

The clamping unit 12 comprises a disk 22 that has a perimeter surface 24. The perimeter surface 24 has a concave portion 26 extending toward a center of the disk 22 such that the concave portion 26 defines the clamping recess 16. Additionally, the concave portion 26 has a first lateral side 28 and a second lateral side 30. The perimeter surface 24 has a pair of holes 32 each extending into an interior of the disk 22, and the disk 22 is substantially hollow. Each of the holes 32 is positioned on a respective one of the first lateral side 28 and the second lateral side 30 of the perimeter surface 24.

The clamping unit 12 includes a pair of arms 34 that each has a first end 36 and a second end 38, and each of the arms 34 is positioned within the disk 22. The first end 36 of each of the arms 34 is pivotally engaged to the disk 22 such that each of the arms 34 is positioned adjacent to a respective one of the first lateral side 28 and the second lateral side 30 of the concave portion 26 of the perimeter surface 24. The first end 36 of each of the arms 34 is positioned adjacent to an intersection between the perimeter surface 24 and the respective first lateral side 28 and second lateral side 30. Each of the arms 34 has a first surface 40 extending between the first end 36 and the second end 38, and the first surface 40 of each of the arms 34 is directed toward each other.

Each of the grips 14 is coupled to and extends laterally away from the first surface 40 of a respective one of the arms 34. Each of the grips 14 extends outwardly through a respective one of the holes 32 in the perimeter surface 24 of the disk 22. Furthermore, a distal end 42 of each of the grips 14 is directed across the clamping recess 16 defined by the concave portion 26. Each of the grips 14 may be comprised of a resiliently compressible material and the distal end 42 of each of the grips 14 may taper to a blunt point.

A linkage 44 is coupled between the second end 38 of each of the arms 34. The linkage 44 is compressible thereby urging the second end 38 of each of the arms 34 toward each other. In this way each of the grips 14 is urged to travel toward each other. Conversely, the linkage 44 is biased into a lengthened condition thereby urging the second end 38 of each of the arms 34 away from each other.

A tube 46 is coupled to and extends away from the clamping unit 12. The tube 46 is curved such that the tube 46 curves beneath the user's armpit 48 when the clamping unit 12 is positioned on the user's trapezius muscle 18. The tube 46 has a primary end 50 and a secondary end 52, and the tube 46 is curved between the primary end 50 and the secondary end 52. The primary end 50 is coupled to the perimeter surface 24 of the disk 22 and the tube 46 is oriented such that the tube 46 curves below the clamping recess 16.

A ball 54 is disposed on the secondary end 52 of the tube 46 and the ball 54 can be gripped. A knob 56 is rotatably disposed on the ball 54 and the knob 56 is in mechanical communication with the clamping unit 12. The grips 14 are urged toward each other when the knob 56 is rotated in a first direction. Conversely, the grips 14 are urged away from each other when the knob 56 is rotated in a second direction. The knob 56 includes a screw 58 that extends into the ball 54 and a plate 60 that is positioned around the screw 58. The plate 60 travels toward the knob 56 when the knob 56 is rotated in the first direction. The plate 60 travels away from the knob 56 when the knob 56 is rotated in the second direction. A biasing member 62 extends around the screw 58 and the biasing member 62 extends between the plate 60 and the first surface 40 of the knob 56. Furthermore, the biasing member 62 biases the plate 60 away from the knob 56.

A cable 64 is provided that has a first end 66 and a second end 68, and the cable 64 extends through the member and into the disk 22. The first end 66 of the cable 64 is coupled to the linkage 44 extending between the second end 38 of each of the arms 34. Additionally, the second end 68 of the cable 64 is coupled to the plate 60. The linkage 44 is compressed when the plate 60 travels toward the knob 56 and the linkage 44 is lengthened when the plate 60 travels away from the knob 56.

In use, the clamping unit 12 is positioned on the user's trapezius muscle 18 such that the member curves beneath the user's armpit 48. The knob 56 is rotated in the first direction for urging the grips 14 toward each other to pinch the user's trapezius muscle 18. Additionally, the clamping unit 12 is aligned with a pre-determined location along the user's trapezius muscle 18 that corresponds to known pressure points. In this way the user 20 can treat symptoms of a headache that are caused by tension in the trapezius muscle 18. Furthermore, the user 20 can pinch the pressure point on their trapezius muscle 18 without assistance thereby facilitating the user 20 to find relief from a tension headache in any situation.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A headache treatment assembly for squeezing a trapezius muscle to treat symptoms of a headache, said assembly comprising: a clamping unit having a pair of pair of grips each being movably disposed in opposing sides of a clamping recess in the clamping unit wherein the clamping recess is configured to receive a trapezius muscle of a user, each of the pair of grips being urgeable toward each other wherein each of the pair of grips is configured to pinch the trapezius muscle at a strategic location to treat symptoms of a headache; a tube being coupled to and extending away from the clamping unit, the tube being curved wherein the tube is configured to curve beneath the user's armpit when the clamping unit is positioned on the user's trapezius muscle; a ball being disposed on the tube; a knob being rotatably disposed on the ball, said knob being in mechanical communication with the clamping unit, the pair of grips being urged toward each other when the knob is rotated in a first direction, the pair of grips being urged away from each other when the knob is rotated in a second direction, the knob having a screw extending into the ball; a plate being positioned around the screw, the plate traveling toward the knob when the knob is rotated in the first direction, the plate traveling away from the knob when the knob is rotated in the second direction; and a biasing member extending around the screw, the biasing member extending between the plate and the knob, the biasing member biasing the plate away from the knob.

2. The assembly according to claim 1, wherein the clamping unit comprises a disk having a perimeter surface, the perimeter surface having a concave portion extending toward a center of the disk such that the concave portion defines the clamping recess, the concave portion having a first lateral side and a second lateral side, the perimeter surface having a pair of holes each extending into an interior of the disk, the disk being substantially hollow, each of the holes being positioned on a respective one of the first lateral side and the second lateral side of the concave portion.

3. The assembly according to claim 2, further comprising a pair of arms, each of the arms having a first end and a second end, each of the arms being positioned within the disk, the first end of each of the arms being pivotally engaged to the disk such that each of the arms is positioned adjacent to a respective one of the first lateral side and the second lateral side of the concave portion, the first end of each of the arms being positioned adjacent to an intersection between the perimeter surface and the respective first lateral side and second lateral side.

4. The assembly according to claim 3, wherein each of the arms has a first surface extending between the first end and the second end of the arm, the first surface of each of the arms being directed toward each other, each of the pair of grips being coupled to and extending laterally away from the first surface of a respective one of the arms, each of the pair of grips extending outwardly through a respective one of the holes in the perimeter surface of said disk such that a distal end of each of the pair of grips is directed across the clamping recess defined by the concave portion.

5. The assembly according to claim 4, further comprising a linkage being coupled between the second end of each of the arms, the linkage being compressible thereby urging the second end of each of the arms toward each other thereby urging each of the pair of grips to travel toward each other, the linkage being biased into a lengthened condition thereby urging the second end of each of the arms away from each other.

6. The assembly according to claim 2, wherein the tube has a primary end and a secondary end, the tube being curved between the primary end and the secondary end, the primary end being coupled to the perimeter surface of the disk, the tube being oriented such that the tube curves below the clamping recess.

7. The assembly according to claim 2, wherein: the clamping unit further includes: a pair of arms, each of the arms having a first end and a second end; and a linkage being coupled between the second end of each of the arms; and a cable having a first end and a second end, the cable extending through the biasing member and into the disk, the first end of the cable being coupled to the linkage extending between the second end of each of the arms, the second end of the cable being coupled to the plate, the linkage being compressed when the plate travels toward the knob, the linkage being lengthened when the plate travels away from the knob.

8. A headache treatment assembly for squeezing a trapezius muscle to treat symptoms of a headache, said assembly comprising: a clamping unit having a pair of grips each being movably disposed in opposing sides of a clamping recess in the clamping unit wherein the clamping recess is configured to receive a trapezius muscle of a user, each of the pair of grips being urgeable toward each other wherein each of the pair of grips is configured to pinch the trapezius muscle at a strategic location to treat symptoms of a headache, the clamping unit comprising: a disk having a perimeter surface, the perimeter surface having a concave portion extending toward a center of the disk such that the concave portion defines the clamping recess, the concave portion having a first lateral side and a second lateral side, the perimeter surface having a pair of holes each extending into an interior of the disk, the disk being substantially hollow, each of the holes being positioned on a respective one of the first lateral side and the second lateral side of the concave portion; a pair of arms, each of the arms having a first end and a second end, each of the arms being positioned within the disk, the first end of each of the arms being pivotally engaged to the disk such that each of the arms is positioned adjacent to a respective one of the first lateral side and said second lateral side of said concave portion, the first end of each of the arms being positioned adjacent to an intersection between the perimeter surface and the respective first lateral side and second lateral side, each of the arms having a first surface extending between the first end and the second end of the arms, the first surface of each of the arms being directed toward each other, each of the pair of grips being coupled to and extending laterally away from the first surface of a respective one of the arms, each of the pair of grips extending outwardly through a respective one of the holes in the perimeter surface of the disk such that a distal end of each of the pair of grips is directed across the clamping recess defined by the concave portion; and a linkage being coupled between the second end of each of the arms, the linkage being compressible thereby urging the second end of each of the arms toward each other thereby urging each of the pair of grips to travel toward each other, the linkage being biased into a lengthened condition thereby urging the second end of each of the arms away from each other; a tube being coupled to and extending away from the clamping unit, the tube being curved wherein the tube is configured to curve beneath the user's armpit when the clamping unit is positioned on the user's trapezius muscle, the tube having a primary end and a secondary end, the tube being curved between the primary end and the secondary end, the primary end being coupled to the perimeter surface of the disk, the tube being oriented such that the tube curves below the clamping recess; a ball being disposed on the secondary end of the tube wherein the ball is configured to be gripped; a knob being rotatably disposed on the ball, the knob being in mechanical communication with the clamping unit, the pair of grips being urged toward each other when the knob is rotated in a first direction, the pair of grips being urged away from each other when the knob is rotated in a second direction, the knob having a screw extending into the ball; a plate being positioned around the screw, the plate traveling toward the knob when the knob is rotated in the first direction, the plate travelling away from the knob when the knob is rotated in the second direction; a biasing member extending around the screw, the biasing member extending between the plate and the first surface of the knob, the biasing member biasing the plate away from the knob; and a cable having a first end and a second end, the cable extending through the member and into the disk, the first end of the cable being coupled to the linkage extending between the second end of each of the arms, the second end of the cable being coupled to the plate, the linkage being compressed when the plate travels toward the knob, the linkage being lengthened when the plate travels away from the knob.

* * * * *